United States Patent
Hua et al.

(10) Patent No.: US 11,926,063 B2
(45) Date of Patent: Mar. 12, 2024

(54) FRACTIONAL ORDER SLIDING MODE SYNCHRONOUS CONTROL METHOD FOR TELEOPERATION SYSTEM BASED ON EVENT TRIGGER MECHANISM

(71) Applicant: Yanshan University, Qinhuangdao (CN)

(72) Inventors: Changchun Hua, Qinhuangdao (CN); Yilu Wang, Qinhuangdao (CN); Yana Yang, Qinhuangdao (CN); Weili Ding, Qinhuangdao (CN); Liuliu Zhang, Qinhuangdao (CN); Shuang Liu, Qinhuangdao (CN); Guanglei Zhao, Qinhuangdao (CN); Wenliang Pei, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 361 days.

(21) Appl. No.: 17/541,406

(22) Filed: Dec. 3, 2021

(65) Prior Publication Data
US 2022/0088786 A1 Mar. 24, 2022

Related U.S. Application Data

(63) Continuation of application No. PCT/CN2020/104512, filed on Jul. 24, 2020.

(30) Foreign Application Priority Data

Dec. 28, 2020 (CN) .......................... 202011584072.7

(51) Int. Cl.
*B25J 9/16* (2006.01)
*B25J 3/00* (2006.01)

(52) U.S. Cl.
CPC .............. *B25J 9/1689* (2013.01); *B25J 3/00* (2013.01); *B25J 9/163* (2013.01)

(58) Field of Classification Search
CPC ... B25J 9/1689; B25J 3/00; B25J 9/163; B25J 9/1605; G05B 2219/40174; G05B 2219/40181
See application file for complete search history.

(56) References Cited

U.S. PATENT DOCUMENTS 9,923,503 B2 * 3/2018 Malek ..................... H02P 21/28
2017/0291295 A1 * 10/2017 Gupta ................ G09B 19/0053

* cited by examiner

*Primary Examiner* — Kira Nguyen
(74) *Attorney, Agent, or Firm* — IPRO, PLLC (57) ABSTRACT

The present invention provides a fractional order sliding mode synchronous control method for a teleoperation system based on an event trigger mechanism. The method comprises: establishing a dynamics model for the teleoperation system by considering external disturbance and parameter uncertainty, selecting a master robot and a slave robot, interactively establishing the teleoperation system through a communication network, determining system parameters of the dynamics model, designing a fractional order nonsingular rapid terminal sliding mode surface equation by utilizing a position tracking error and a fractional order calculus, setting a trigger event condition of information interaction between the master robot and the slave robot, designing a self-adaptive fractional order nonsingular rapid terminal sliding mode controller based on the sliding mode, designing a Lyapunov function to carry out stability analysis, proving the boundedness of a closed-loop state signal of the system.

3 Claims, 5 Drawing Sheets

FRACTIONAL ORDER SLIDING MODE SYNCHRONOUS CONTROL METHOD FOR TELEOPERATION SYSTEM BASED ON EVENT TRIGGER MECHANISM

TECHNICAL FIELD

The present invention relates to a control technology of a teleoperation system of a robot, and particularly to a fractional order sliding mode synchronous control method for the teleoperation system based on an event trigger mechanism.

BACKGROUND

As a human-computer interaction tool, the teleoperation system can extend the perception and the operation capability of a human to a remote working environment, the slave robot can simulate the behavior of the master robot through a communication network, and the master robot can adjust a control strategy according to the fed-back working state of the slave robot, so that the effective operation of a remote controlled object is finally realized. It is widely applied to the fields of space operation, ocean exploration, nuclear energy technology and the like. Particularly, with the outbreak of new coronavirus in the world of this year, the reduction of human-to-human contact is an effective way for preventing further spread of epidemic situation. In such severe situations, teleoperation system is receiving increasing attention due to its unique application value in telesurgery and teleservices. At present, high-precision control of the teleoperation system faces a great challenge, on one hand, it is because the teleoperation of a robot is a typical multivariable nonlinear coupling system and is easily affected by uncertainties such as system model, parameter change and external working environment disturbance. On the other hand, information exchange between the master robot and the slave robot is inevitably limited by network bandwidth and transmission rate.

The sliding mode variable structure nonlinear control theory has good robustness on external interference, parameter change and unmodeled dynamics. In order to achieve the synchronous control target of high precision, strong robustness and rapidity of the teleoperation system, an Integer-Order Sliding Mode Control (IOSMC) finite time control method is firstly provided, and a good effect is achieved in the application of the teleoperation system. In fact, Fractional-Order (FO) calculus is generalized as an integer-order calculus, so that the order of the system and the controller is not limited to integers, C. Yin proposes a Fractional-Order Sliding Mode Control (FOSMC), and indicates that, compared with the IOSMC, the FOSMC can improve the degree of freedom of the controller, and has richer dynamic characteristics, higher robustness, faster response speed and convergence speed. For a teleoperation system with high precision requirement, the response speed and the convergence speed are also one of important performance indexes. Until now, most of information interaction of the master and slave robots depends on continuous time communication or intermittent communication protocols, and signals need to be transmitted between a controller and an actuator continuously and periodically, and the signals are frequently responded, so that the control target of the system is realized. However, in practical applications, the above control method based on time triggering has the following problems: 1) the frequent response of the actuator can accelerate the wear and aging of mechanical equipment and shorten the service life. 2) The periodic transmissions and updates of the controller may be redundant, wasting computational processing resources of the processor and increasing communication burden. To make up for the deficiency, many scholars such as Dong Yue have proposed an event-triggered control strategy, which reduces the frequency of controller updates (the update of control information is only after event triggering) and saves communication bandwidth resources while ensuring the required performance of the system. Most trigger mechanisms are built under the assumption that the state triggering error input is stable, which is not reasonable in the presence of system unknown parameters. Therefore, it is urgently needed to provide a position tracking control strategy of the teleoperation system under an event trigger mechanism so as to solve the problems of energy, calculation and communication constraints.

SUMMARY

Aiming at the defects in the prior art, the present invention provides a fractional order sliding mode synchronous control method for a teleoperation system based on an event trigger mechanism. The method comprises the steps of: establishing a dynamics model for the teleoperation system by considering external disturbance and parameter uncertainty, selecting a master robot and a slave robot, interactively establishing the teleoperation system through a communication network, determining system parameters of the dynamics model, designing a fractional order nonsingular rapid terminal sliding mode surface equation by utilizing a position tracking error and a fractional order calculus, setting a trigger event condition of information interaction between the master robot and the slave robot, designing a self-adaptive fractional order nonsingular rapid terminal sliding mode controller based on the sliding mode, designing a Lyapunov function to carry out stability analysis, proving the boundedness of a closed-loop state signal of the system, enabling the slave robot to track the master robot within a limited time, and realizing rapid high-precision synchronous control of the teleoperation system. The present invention can avoid the singularity problem, simultaneously expand the degree of freedom of the controller, accelerate the convergence speed, improve the control precision, reduce the buffeting problem existing in the integer order sliding mode surface, have stronger applicability, greatly reduce the occupation of network bandwidth and communication resources and improve the utilization rate of the resources.

The present invention provides a fractional order sliding mode synchronous control method for a teleoperation system based on an event trigger mechanism. The method comprises steps of:

S1, establishing a dynamic model for the teleoperation system by considering external disturbance and parameter uncertainty, wherein the dynamic model is:

$$M_m(q_m)\ddot{q}_m+C_m(q_m,\dot{q}_m)\dot{q}_m+G_m(q_m)+B_m(\dot{q}_m)=\tau_m+F_h$$

$$M_s(q_s)\ddot{q}_s+C_s(q_s,\dot{q}_s)\dot{q}_s+G_s(q_s)+B_s(\dot{q}_s)=\tau_s+F_e \quad (1)$$

in which, $q_i$, $\dot{q}_i$, $\ddot{q}_1 \in R^n$ respectively represent a generalized displacement, a speed and an acceleration of n joints of the robot; $M_i(q_i)$ represents a positive definite inertial matrix of the system; $C_i(q_i, \dot{q}_i)$ represents a matrix of Coriolis forces and centrifugal forces of the system; $G_i(q_i)$ represents a gravity moment of the system; $F_h$, $F_e \in R^n$ respectively represent an external force applied by an operator and an external force applied by the environment; $\tau_i \in R^n$ represents a generalized input moment; $B_i(\dot{q}_i) \in R^n$ represents a unknown external interference; i=m, s, m represents a master robot, s represents a slave robot;

$M_i(q_i)$, $C_i(q_i,\dot{q}_i)$ and $G_i(q_i)$ have a relationship of:

$$\begin{cases} M_i(q_i) = M_{oi}(q_i) + \Delta M_i(q_i) \in R^{n \times n} \\ C_i(q_i, \dot{q}_i) = C_{oi}(q_i, \dot{q}_i) + \Delta C_i(q_i, \dot{q}_i) \in R^{n \times n} \\ G_i(q_i) = G_{oi}(q_i) + \Delta G_i(q_i) \in R^n \end{cases} \quad (2)$$

in which, $M_{oi}(q_i)$ represents a nominal value of the positive definite inertia matrix of the system; $C_{oi}(q_i,\dot{q}_i)$ represents a nominal value of the matrix of Coriolis forces and centrifugal forces of the system; $G_{oi}(q_i)$ represents a nominal value of the gravity moment of the system; $\Delta M_i(q_i)$ represents parameter change of the positive definite inertia matrix of the system; $\Delta C_i(q_i,\dot{q}_i)$ represents parameter change of the matrix of Coriolis forces and centrifugal forces of the system; $\Delta_{Gi}(q_i)$ represents parameter change of the gravity moment of the system;

at the same time, $B_i(\dot{q}_i)$ satisfies:

$$\|B_i(\dot{q}_i)\| \leq \overline{B}_i \quad (3)$$

in which, $\overline{B}_i$ represents an unknown positive number; then, $$\begin{cases} P_m(q_m, \dot{q}_m, \ddot{q}_m) = -\Delta M_m(q_m)\ddot{q}_m - \Delta C_m(q_m, \dot{q}_m)\dot{q}_m - \\ \qquad \Delta G_m(q_m) - B_m(\dot{q}_m) \in R^n \\ P_s(q_s, \dot{q}_s, \ddot{q}_s) = -\Delta M_s(q_s)\ddot{q}_s - \Delta C_s(q_s, \dot{q}_s)\dot{q}_s - \Delta G_s(q_s) - \\ \qquad B_s(\dot{q}_s) \in R^n \end{cases} \quad (4)$$

in which, $P_m(q_m,\dot{q}_m,\ddot{q}_m)$ represents a parameter matrix of the master robot; $P_s(q_s,\dot{q}_s,\ddot{q}_s)$ represents a parameter matrix of the slave robot;

$P_m(q_m,\dot{q}_m,\ddot{q}_m)$ and $P_s(q_s,\dot{q}_s,\ddot{q}_s)$ are bounded and satisfies:

$$\|P_m(q_m,\dot{q}_m,\ddot{q}_m)\| \leq \kappa_m$$

$$\|P_m(q_m,\dot{q}_m,\ddot{q}_m)\| \leq \kappa_s \quad (5)$$

in which, $\kappa_m$ represents an upper limit of $\|P_m(q_m,\dot{q}_m,\ddot{q}_m)\|$, $\kappa_m = b_{0m} + b_{1m}\|q_m\| + b_{2m}\|\dot{q}_m\|^2$; $\kappa_s$ represents an upper limit of $\|P_s(q_s,\dot{q}_s,\ddot{q}_s)\|$, $\kappa_s = b_{0s} + b_{1s}\|q_s\| + b_{2s}\|\dot{q}_s\|^2$; $b_{0i},b_{1i},b_{2i}$(i=m, s) is a positive constant;

accordingly, equation (1) for the system is re-represented as:

$$\begin{cases} M_{om}(q_m)\ddot{q}_m + C_{om}(q_m, \dot{q}_m)\dot{q}_m + G_{om}(q_m) = \tau_m + \\ \qquad P_m(q_m, \dot{q}_m, \ddot{q}_m) + F_h \\ M_{os}(q_s)\ddot{q}_s + C_{os}(q_s, \dot{q}_s)\dot{q}_s + G_{os}(q_s) = \tau_s + \\ \qquad P_s(q_s, \dot{q}_s, \ddot{q}_s) - F_e \end{cases} \quad (6)$$

S2, selecting the master robot and the slave robot, interactively constructing the teleoperation system through a communication network, measuring respectively mass and length information of a master robot connecting rod and a slave robot connecting rod and real-time robot position information of the master robot connecting rod and the slave robot connecting rod, and determining system parameters of the dynamic model;

S3, designing a sliding mode surface equation of a fractional order nonsingular rapid terminal by using position tracking errors of the master robot and the slave robot and Riemarm-Liouville fractional order calculus;

S4, setting a trigger event condition of information interaction between the master robot and the slave robot, designing a self-adaptive fractional order nonsingular rapid terminal sliding mode controller which can compensate measurement errors and eliminate the influence of system uncertainty based on the sliding mode, enabling the controller to avoid the Zeno phenomenon, designing a Lyapunov function to carry out stability analysis, proving the boundedness of a closed-loop state signal of the system.

By adopting the fractional order sliding mode synchronous control method for the teleoperation system based on the event trigger mechanism, the slave robot can track the motion of the master robot within a limited time, and the fast and high-precision synchronous control of the teleoperation system is realized.

Preferably, system parameters of the dynamical model in step S2 comprise nominally determined parts of the inertia matrix, the matrix of Coriolis forces and centrifugal forces, and the gravity matrix of the master robot and the slave robot, and are all calculated from the length, mass, and joint position information of a mechanical arm.

Further, the position tracking errors of the master robot and the slave robot in step S3 are:

$$e_m = q_m - q_s(t-d_s)$$

$$e_s = q_s - q_m(t-d_m) \quad (7)$$

in which, $e_m$ represents position tracking error of the master robot; $e_s$ represents position tracking error of the slave robot; $d_m$ represents fixed-length time delay of forward information transmission from the master robot to the slave robot; $d_s$ represents fixed-length time delay of backward information transmission from the slave robot to the master robot, and $d_m \neq d_s$; t represents an operating time;

the fractional order nonsingular rapid terminal sliding mode surface equation is:

$$s_m(t) = \dot{e}_m + \alpha_{m1} D^{\alpha_1 - 1}[\text{sig}(e_m)^{\gamma_{m1}}] + \alpha_{m2} D^{\alpha_2}[\beta_m(e_m)]$$

$$s_s(t) = \dot{e}_s + \alpha_{s1} D^{\alpha_1 - 1}[\text{sig}(e_s)^{\gamma_{s1}}] + \alpha_{s2} D^{\alpha_2}[\beta_s(e_s)] \quad (8)$$

in which, $s_i$ represents designed fractional order nonsingular fast terminal sliding mode surface, $s_i = [s_{i1}, s_{i2}, \ldots s_{in}]^T \in R^n$; $\gamma_{i1}$ is a positive constant, $\gamma_{m1}, \gamma_{s1} > 1$; $\alpha_1, \alpha_2$ represent fractional orders and $\alpha_1 \in (0,1], \alpha_2 \in [0,1)$; $D^{\alpha_1 - 1}\text{sig}(e_i)^{\gamma_{i1}}$ represents $\alpha_1 - 1$ ordered Riemann-Liouville fractional order derivative of $\text{sig}(e_i)\gamma^1$; $D^{\alpha_2}[\beta_i(e_i)]$ represents $\alpha_2$ ordered Riemann-Liouville fractional order derivative of $\beta_i(e_i)$; $\alpha_{i1}$ and $\alpha_{i2}$ both represent parameters of the sliding mode surface equation and are positive definite diagonal matrix, $\alpha_{i1} = \text{diag}(\alpha_{i11}, \alpha_{i12}, \ldots, \alpha_{i1n})$, $\alpha_{i2} = \text{diag}(\alpha_{i21}, \alpha_{i22}, \ldots, \alpha_{i2n})$; functions $\beta_m(e_m)$, $\beta_s(e_s)$ are described as:

$$\beta_m(e_m) = \begin{cases} \text{sig}(e_m)^{\gamma_{m2}}, & \text{if } \overline{s}_m = 0 \text{ or } \overline{s}_m \neq 0, |e_m| > \delta_m \\ k_{m1}e_m + k_{m2}\text{sign}(e_m)e_m^2, & \text{if } \overline{s}_m \neq 0, |e_m| \leq \delta_m \end{cases} \quad (9)$$

$$\beta_s(e_s) = \begin{cases} \text{sig}(e_s)^{\gamma_{s2}}, & \text{if } \overline{s}_s = 0 \text{ or } \overline{s}_s \neq 0, |e_s| > \delta_s \\ k_{s1}e_s + k_{s2}\text{sign}(e_s)e_s^2, & \text{if } \overline{s}_s \neq 0, |e_s| \leq \delta_s \end{cases}$$

in which, $\overline{s}_m$ represents a terminal sliding mode surface which shows that the main robot has a singularity problem, $\overline{s}_m = \dot{e}_m + \alpha_{m1} D^{\alpha_1 - 1}[\text{sig}(e_m)^{\gamma_{m1}}] + \alpha_{m2} D^{\alpha_2}[\text{sig}(e_m)^{\gamma_{m2}}]$; $\overline{s}_s$ represents a terminal sliding mode surface which shows that the slave robot has a singularity problem, $\overline{s}_s = \dot{e}_s + \alpha_{s1} D^{\alpha_1 - 1}[\text{sig}(e_s)^{\gamma_{s1}}] + \alpha_{s2} D^{\alpha_2}[\text{sig}(e_s)^{\gamma_{s2}}]$; $\gamma_{i2}$ is a positive constant, $0 < \gamma_{m2}, \gamma_{s2} < 1$; $k_{m1}$ is a positive constant, $k_{m1} = (2 - \gamma_{m2})\delta_m^{\gamma_{m2}-1}$; $k_{m2}$ is a positive constant, $k_{m2} = (\gamma_{m2}-1)\delta_m^{\gamma_{m2}-2}$;

$k_{s1}$ is a positive constant, $k_{s1}=(2-\gamma_{s2})\delta_s^{\gamma_{m2}-1}$; $k_{s2}$ is a positive constant, $k_{s2}=(\gamma_{s2}-1)\delta_s^{\gamma_{s2}-2}$; $\delta_m,\delta_s$ represents designed small constant.

Further, in step S4, the trigger event condition is:

$$\begin{cases} \tau_i(t) = u_i(t_k^i), & \forall t \in [t_k^i, t_{k+1}^i) \\ t_{k+1}^i = \inf\{t \in R | z_i(t) | z_i(t) \geq b_i\}, & t_1^i = 0, j = 1, 2, \ldots, n \end{cases} \quad (10)$$

in which, $z_i(t)$ represents a measurement error, $z_i(t)=[z_{i1}, z_{i2}, \ldots, z_{in}]^T$ and $z_i(t)=u_i(t)-\tau_i(t)$; $\tau_i(t)$ represents a generalized input moment of the teleoperation system, $\tau_i(t)=[\tau_{i1}, \tau_{i2}, \ldots, \tau_{in}]^T$; $b_i$ represents a positive definite matrix, $b_i(t)=[b_{i1}, b_{i2}, \ldots, b_{in}]^T \in R^n$; $u_i(t)$ represents actual controller under event trigger mechanism, $u_i(t)=[u_{i1}, u_{i2}, \ldots, u_{in}]^T$; $t_k^i$, $k \in z^+$ represents controller update time;

in a period of time $t^i \in [t_k^i, t_{k+1}^i)$, the control signal remains constant until $t^i=t_{k+1}^i$, minimum internal time of the mentioned event trigger mechanism is strictly greater than 0, which eliminates occurrence of the Zeno behavior;

based on the designed sliding mode, the actual controller is chosen as:

$$\tau_i(t)=u_i(t)-\lambda_i(t)b_i \quad (11)$$

in which, $\lambda_i(t)$ represents a continuous time-varying parameter satisfying conditions $\lambda_i(t_k^i)=0, \lambda_i(t_{k+1}^i)=\pm 1$ and $|\lambda_i(t)| \leq 1$, $\forall t \in [t_k^i, t_{k+1}^i)$;

the sliding mode controller of the self-adaptive fractional order nonsingular rapid terminal is designed as:

$$\begin{cases} u_m(t) = \overline{u}_m - \overline{b}_m \tanh(s_m^T M_{om}^{-1} \overline{b}_m / \varepsilon_m) \\ \overline{u}_m = M_{om}(q_m)\ddot{q}_s(t-d_s) + C_{om}(q_m, \dot{q}_m)\dot{q}_m + \\ \quad G_{om}(q_m) + \overline{u}_{m1} + \overline{u}_{m2} \\ \overline{u}_{m1} = -M_{om}(\Theta_m sig(s_m)^\mu + \alpha_{m1} D^{\alpha_1}[sig(e_m)^{\gamma_{m1}}] + \\ \quad \alpha_{m2} D^{\alpha_2+1}[\beta_m(e_m)]) \\ \overline{u}_{m2} = \begin{cases} -\dfrac{s_m^T M_{om}^{-1}}{\|s_m^T M_{om}^{-1}\|}\hat{\kappa}_m, & \text{if } s_m^T M_{om}^{-1} \neq 0 \\ 0, & \text{if } s_m^T M_{om}^{-1} = 0 \end{cases} \end{cases} \quad (12)$$

$$\begin{cases} u_s(t) = \overline{u}_s - \overline{b}_s \tanh(s_s^T M_{os}^{-1} \overline{b}_s / \varepsilon_s) \\ \overline{u}_s = M_{os}(q_s)\ddot{q}_m(t-d_m) + C_{os}(q_s, \dot{q}_s)\dot{q}_s + \\ \quad G_{os}(q_s) + \overline{u}_{s1} + \overline{u}_{s2} \\ \overline{u}_{s1} = -M_{os}(\Theta_s sig(s_s)^\mu + \alpha_{s1} D^{\alpha_1}[sig(e_s)^{\gamma_{s1}}] + \\ \quad \alpha_{s2} D^{\alpha_2+1}[\beta_s(e_s)]) \\ \overline{u}_{s2} = \begin{cases} -\dfrac{s_s^T M_{os}^{-1}}{\|s_s^T M_{os}^{-1}\|}\hat{\kappa}_s, & \text{if } s_s^T M_{os}^{-1} \neq 0 \\ 0, & \text{if } s_s^T M_{os}^{-1} = 0 \end{cases} \end{cases} \quad (13)$$

in which, $\overline{b}_m$ represents a positive definite matrix, $\overline{b}_m=[\overline{b}_{m1}, \overline{b}_{m2}, \ldots, \overline{b}_{mn}]^T$ and satisfies the constant $\overline{b}_{mj}>b_{mj}(j=1, 2, \ldots, n)$; $\overline{b}_s$ represents a positive definite matrix, $\overline{b}_s=[\overline{b}_{s1}, \overline{b}_{s2}, \ldots, \overline{b}_{sn}]^T$ and satisfies the constant $\overline{b}_{sj}>b_{sj}(j=1, 2, \ldots, n)$; $\varepsilon_m, \varepsilon_s$ represents a positive constant to be designed; $\Theta_i$ represents a positive definite diagonal matrix, $\Theta_i=\text{diag}[\theta_{i1}, \theta_{i2}, \ldots, \theta_{in}]$ and satisfies the constant $\theta_{ij}>0$ ($j=1, 2, \ldots, n$); $\mu$ represents a positive constant to be designed and satisfies $\mu \in (0,1)$; $\hat{\kappa}$ represents an estimated value of an upper bound of $\|P_m(q_m, \dot{q}_n, \ddot{q}_m)\|$, $\hat{\kappa}_m=\hat{b}_{0m}+\hat{b}_{1m}\|+\hat{b}_{2m}\|\dot{q}_m\|^2$; $\hat{\kappa}_s$ represents an estimated value of an upper bound of $\|P_s(q_s, \dot{q}_s, \ddot{q}_s)\|$, $\hat{\kappa}_s=\hat{b}_{0s}+\hat{b}_{1s}\|+\hat{b}_{2s}\|\dot{q}_s\|^2$; variables $\hat{b}_{0i}, \hat{b}_{1i}, \hat{b}_{2i}$ representing estimated values of parameters $b_{0i}, b_{1i}, b_{2i}$, respectively;

the self-adaptation law is designed as:

$$\begin{aligned} \dot{\hat{b}}_{0i} &= \Lambda_{0i} \|s_i^T M_{oi}^{-1}\| \\ \dot{\hat{b}}_{1i} &= \Lambda_{1i} \|s_i^T M_{oi}^{-1}\| \|q_i\| \\ \dot{\hat{b}}_{2i} &= \Lambda_{2i} \|s_i^T M_{oi}^{-1}\| \|q_i\|^2 \end{aligned} \quad (14)$$

in which, $\Lambda_{0i}, \Lambda_{1i}, \Lambda_{2i}$ represents positive constants;

a Lyapunov function is selected as:

$$V = V_1 + V_2 \quad (15)$$

$$V_1 = \sum_{i=m,s} \frac{1}{2} s_i^T s_i$$

$$V_2 = \sum_{i=m,s} \frac{1}{2} \sum_{j=0}^{2} \Lambda_{ji}^{-1} \tilde{b}_{ji}^2$$

in which, V represents a Lyapunov function; $V_1$ represents a first Lyapunov function, $V_2$ represents a second Lyapunov function, $\tilde{b}_{ji}=b_{ji}-\hat{b}_{ji}$ represents a self-adaptive estimation error, $j=1, 2, \ldots, n$;

limited time stable operation of the nonlinear uncertain teleoperation system is ensured through stability analysis.

Compared with the prior art, the present invention has the technical effects as follows.

(1) According to the present invention, the dynamic model for the teleoperation system under the conditions of unknown external interference and parameter uncertainty is established, and the fractional order nonsingular rapid terminal sliding mode surface is adopted, so that the singularity problem can be avoided, the degree of freedom of the controller is expanded, the convergence speed is accelerated, the control precision is improved, the buffeting problem existing in an integer order sliding mode surface is reduced, and the applicability is stronger.

(2) Compared with the prior art in which the synchronous control mode of the traditional periodic sampling of the teleoperation is adopted, the method provided by the present invention has the advantages that on the premise of ensuring the synchronous control performance of the system, the master robot and the slave robot only need to carry out intermittent communication and controller transmission and updating when the event trigger condition is met, the occupation of network bandwidth and communication resources is greatly reduced, and the utilization rate of the resources is improved.

BRIEF DESCRIPTION OF THE DRAWINGS

Other features, objects and advantages of the present application will become more apparent upon reading of the following detailed description of non-limiting embodiments thereof with reference to the accompanying drawings.

DETAILED DESCRIPTION OF THE EMBODIMENTS

The present application will be described in further detail with reference to the drawings and embodiments below. It is to be understood that the specific embodiments described herein are merely illustrative of the relevant invention and not restrictive of the present invention. It should be noted that, for convenience of description, only the portions related to the related invention are shown in the drawings.

It should be noted that the embodiments and features of the embodiments in the present application may be combined with each other without conflict. The present application will be described in detail below with reference to the embodiments with reference to the attached drawings.

Figure 2:
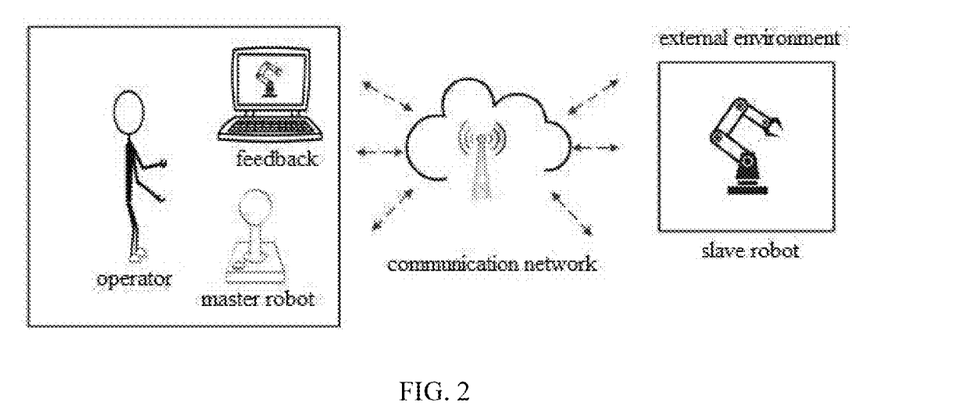
FIG. 2 is a block diagram of the architecture of a bilateral teleoperation system according to the present invention.

FIG. 2 is a block diagram of the architecture of a teleoperation system according to the present invention, depicting a complete teleoperation system, where the operator operates the master robot locally, while the slave robot works on site. The master robot transmits the relevant control information to the slave robot through a communication network, the slave robot feeds back the state information and the acting force of the external environment to the master robot through the network, and the operator can truly sense the change of the remote environment. And the master robot and the slave robot utilize the feedback information to adjust the control strategy, and finally realize the effective operation on the remote controlled object.

Figure 1:
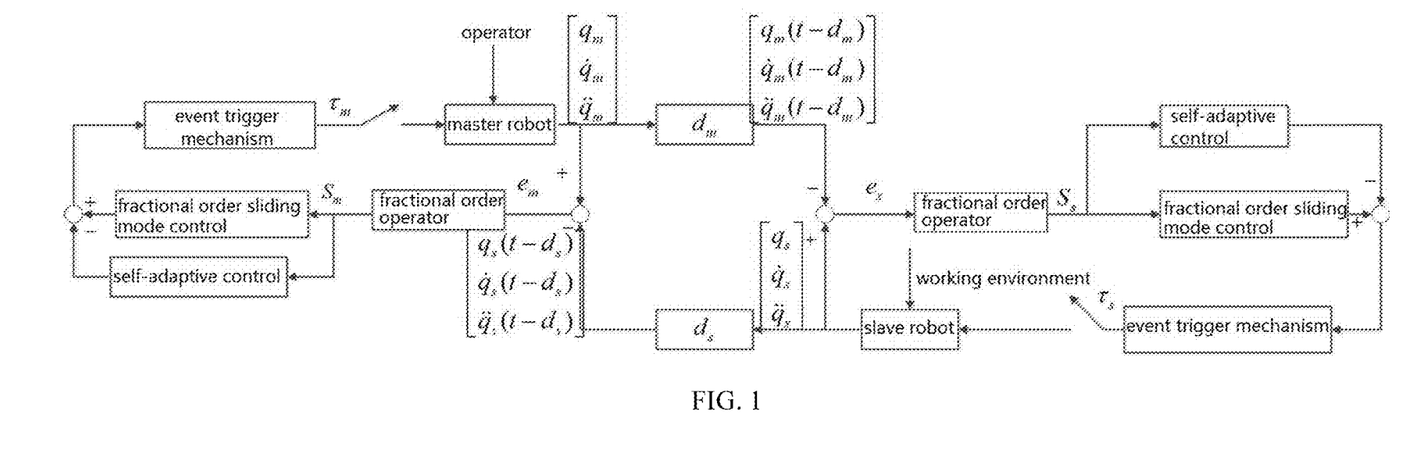
FIG. 1 is a control schematic diagram of a fractional order sliding mode synchronization control method for a teleoperation system based on an event trigger mechanism according to the present invention.

FIG. 1 shows a fractional order sliding mode synchronous control method for a teleoperation system based on an event trigger mechanism. The method comprises steps of:

S1, establishing a dynamic model for the teleoperation system by considering external disturbance and parameter uncertainty, wherein the dynamic model is:

$$M_m(q_m)\ddot{q}_m + C_m(q_m,\dot{q}_m)\dot{q}_m + G_m(q_m) + B_m(\dot{q}_m) = \tau_m + F_h$$

$$M_s(q_s)\ddot{q}_s + C_s(q_s,\dot{q}_s)\dot{q}_s + G_s(q_s) + B_s(\dot{q}_s) = \tau_s + F_e \quad (1)$$

in which, $q_i, \dot{q}_i, \ddot{q}_i \in R^n$ respectively represent a generalized displacement, a speed and an acceleration of n joints of the robot; $M_i(q_i)$ represents a positive definite inertial matrix of the system; $C_i(q_i, \dot{q}_i)$ represents a matrix of Coriolis forces and centrifugal forces of the system; $G_i(q_i)$ represents a gravity moment of the system; $F_h, F_e \in R^n$ respectively represent an external force applied by an operator and an external force applied by the environment; $\tau_i \in R^n$ represents a generalized input moment; $B_i(\dot{q}_i) \in R^n$ represents a unknown external interference; i=m, s, m represents a master robot, s represents a slave robot.

$M_i(q_i)$, $C_i(q_i,\dot{q}_i)$ and $G_i(q_i)$ have a relationship of:

$$\begin{cases} M_i(q_i) = M_{oi}(q_i) + \Delta M_i(q_i) \in R^{n\times n} \\ C_i(q_i, \dot{q}_i) = C_{oi}(q_i, \dot{q}_i) + \Delta C_i(q_i, \dot{q}_i) \in R^{n\times n} \\ G_i(q_i) = G_{oi}(q_i) + \Delta G_i(q_i) \in R^n \end{cases} \quad (2)$$

in which, $M_{oi}(q_i)$ represents a nominal value of the positive definite inertia matrix of the system; $C_{oi}(q_i,\dot{q}_i)$ represents a nominal value of the matrix of Coriolis forces and centrifugal forces of the system; $G_{oi}(q_i)$ represents a nominal value of the gravity moment of the system; $\Delta M_i(q_i)$ represents parameter change of the positive definite inertia matrix of the system; $\Delta C_i(q_i,\dot{q}_i)$ represents parameter change of the matrix of Coriolis forces and centrifugal forces of the system; $\Delta_{Gi}(q_i)$ represents parameter change of the gravity moment of the system.

At the same time, $B_i(\dot{q}_i)$ satisfies:

$$\|B_i(\dot{q}_i)\| \le \overline{B}_i \quad (3)$$

in which, $\overline{B}_i$ represents an unknown positive number. Then, $$\begin{cases} P_m(q_m,\dot{q}_m,\ddot{q}_m) = -\Delta M_m(q_m)\ddot{q}_m - \Delta C_m(q_m,\dot{q}_m)\dot{q}_m - \\ \qquad \Delta G_m(q_m) - B_m(\dot{q}_m) \in R^n \\ P_s(q_s,\dot{q}_s,\ddot{q}_s) = -\Delta M_s(q_s)\ddot{q}_s - \Delta C_s(q_s,\dot{q}_s)\dot{q}_s - \Delta G_s(q_s) - \\ \qquad B_s(\dot{q}_s) \in R^n \end{cases} \quad (4)$$

in which, $P_m(q_m,\dot{q}_m,\ddot{q}_m)$ represents a parameter matrix of the master robot; $P_s(q_s,\dot{q}_s,\ddot{q}_s)$ represents a parameter matrix of the slave robot.

$P_m(q_m,\dot{q}_m,\ddot{q}_m)$ and $P_s(q_s,\dot{q}_s,\ddot{q}_s)$ are bounded and satisfies:

$$\|P_m(q_m,\dot{q}_m,\ddot{q}_m)\| \le \kappa_m$$

$$\|P_m(q_m,\dot{q}_m,\ddot{q}_m)\| \le \kappa_s \quad (5)$$

in which, $\kappa_m$ represents an upper limit of $\|P_m(q_m,\dot{q}_m,\ddot{q}_m)\|$, $\kappa_m = b_{0m} + b_{1m}\|q_m\| + b_{2m}\|\dot{q}_m\|^2$; $\kappa_s$ represents an upper limit of $P_s(q_s,\dot{q}_s,\ddot{q}_s)$, $\kappa_s = b_{0s} + b_{1s}\|q_s\| + b_{2s}\|\dot{q}_s\|^2$; $b_{0i}$, $b_{1i}$, $b_{2i}$(i=m, s) is a positive constant.

Accordingly, equation (1) for the system may be re-represented as:

$$\begin{cases} M_{om}(q_m)\ddot{q}_m + C_{om}(q_m,\dot{q}_m)\dot{q}_m + G_{om}(q_m) = \tau_m + \\ \qquad P_m(q_m,\dot{q}_m,\ddot{q}_m) + F_h \\ M_{os}(q_s)\ddot{q}_s + C_{os}(q_s,\dot{q}_s)\dot{q}_s + G_{os}(q_s) = \tau_s + \\ \qquad P_s(q_s,\dot{q}_s,\ddot{q}_s) - F_e \end{cases} \quad (6)$$

S2 is of selecting the master robot and the slave robot, interactively constructing the teleoperation system through a communication network, measuring respectively mass and length information of a master robot connecting rod and a slave robot connecting rod and real-time robot position information of the master robot connecting rod and the slave robot connecting rod, and determining system parameters of the dynamic model.

System parameters of the dynamical model in step S2 comprise nominally determined parts of the inertia matrix, the matrix of Coriolis forces and centrifugal forces, and the gravity matrix of the master robot and the slave robot, and are all calculated from the length, mass, and joint position information of a mechanical arm.

S3 is of designing a sliding mode surface equation of a fractional order nonsingular rapid terminal by using position tracking errors of the master robot and the slave robot and Riemann-Liouville fractional order calculus.

The position tracking errors of the master robot and the slave robot in step S3 are:

$$e_m = q_m - q_s(t-d_s)$$

$$e_s = q_s - q_m(t-d_m) \quad (7)$$

in which, $e_m$ represents position tracking error of the master robot; $e_s$ represents position tracking error of the slave robot; $d_m$ represents fixed-length time delay of forward information transmission from the master robot to the slave robot; $d_s$ represents fixed-length time delay of backward information transmission from the slave robot to the master robot, and $d_m \neq d_s$; t represents an operating time.

The fractional order nonsingular rapid terminal sliding mode surface equation is:

$$s_m(t) = \dot{e}_m + \alpha_{m1} D^{\alpha_1 - 1}[\text{sig}(e_m)^{\gamma_{m1}}] + \alpha_{m2} D^{\alpha_2}[\beta_m(e_m)]$$

$$s_s(t) = \dot{e}_s + \alpha_{s1} D^{\alpha_1 - 1}[\text{sig}(e_s)^{\gamma_{s1}}] + \alpha_{s2} D^{\alpha_2}[\beta_s(e_s)] \quad (8)$$

in which, $s_i$ represents designed fractional order nonsingular fast terminal sliding mode surface, $s_i = [s_{i1}, s_{i2}, \ldots s_{in}]^T \in R^n$; $\gamma_{i1}$ is a positive constant, $\gamma_{m1}, \gamma_{s1} > 1$; $\alpha_1$, $\alpha_2$ represent fractional orders and $\alpha_1 \in (0,1], \alpha_2 \in [0, 1)$; $D^{\alpha_i - 1} \text{sig}(e_i)^{\gamma_{i1}}]$ represents $\alpha_1 - 1$ ordered Riemann-Liouville fractional order derivative of $\text{sig}(e_i)^{\gamma_{i1}}$; $D^{\alpha_2}[\beta_i(e_i)]$ represents $\alpha_2$ ordered Riemann-Liouville fractional order derivative of $\beta_i(e_1)$; $\alpha_{i1}$ and $\alpha_{i2}$ both represent parameters of the sliding mode surface equation and are positive definite diagonal matrix, $\alpha_{i1} = \text{diag}(\alpha_{i11}, \alpha_{i12}, \ldots, \alpha_{i1n})$, $\alpha_{i2} = \text{diag}(\alpha_{i21}, \alpha_{i22}, \ldots, \alpha_{i2n})$; functions $\beta_m(e_m)$, $\beta_s(e_s)$ are described as:

$$\beta_m(e_m) = \begin{cases} \text{sig}(e_m)^{\gamma_{m2}}, & \text{if } \bar{s}_m = 0 \text{ or } \bar{s}_m \neq 0, |e_m| > \delta_m \\ k_{m1} e_m + k_{m2} \text{sign}(e_m) e_m^2, & \text{if } \bar{s}_m \neq 0, |e_m| \leq \delta_m \end{cases} \quad (9)$$

$$\beta_s(e_s) = \begin{cases} \text{sig}(e_s)^{\gamma_{s2}}, & \text{if } \bar{s}_s = 0 \text{ or } \bar{s}_s \neq 0, |e_s| > \delta_s \\ k_{s1} e_s + k_{s2} \text{sign}(e_s) e_s^2, & \text{if } \bar{s}_s \neq 0, |e_s| \leq \delta_s \end{cases}$$

in which, $\bar{s}_m$ represents a terminal sliding mode surface which shows that the main robot has a singularity problem, $\bar{s}_m = \dot{e}_m + \alpha_{m1} D^{\alpha_1 - 1}[\text{sig}(e_m)^{\gamma_{m1}}] + \alpha_{m2} D^{\alpha_2}[\text{sig}(e_m)^{\gamma_{m2}}]$; $\bar{s}_s$ represents a terminal sliding mode surface which shows that the slave robot has a singularity problem, $\bar{s}_s = \dot{e}_s + \alpha_{s1} D^{\alpha_1 - 1}[\text{sig}(e_s)^{\gamma_{s1}}] + \alpha_{s2} D^{\alpha_2}[\text{sig}(e_s)^{\gamma_{s2}}]$; $\gamma_{i2}$ is a positive constant, $0 < \gamma_{m2}, \gamma_{s2} < 1$; $k_{m1}$ is a positive constant, $k_{m1} = (2 - \gamma_{m2}) \delta_m^{\gamma_{m2}-1}$; $k_{m2}$ is a positive constant, $k_{m2} = (\gamma_{m2} - 1) \delta_m^{\gamma_{m2}-2}$; $k_{s1}$ is a positive constant, $k_{s1} = (2 - \gamma_{s2}) \delta_s^{\gamma_{s2}-1}$; $k_{s2}$ is a positive constant, $k_{s2} = (\gamma_{s2} - 1) \delta_s^{\gamma_{s2}-2}$; $\delta_m, \delta_s$ represents designed small constant.

S4 is of setting a trigger event condition of information interaction between the master robot and the slave robot, designing a self-adaptive fractional order nonsingular rapid terminal sliding mode controller which can compensate measurement errors and eliminate the influence of system uncertainty based on the sliding mode, enabling the controller to avoid the Zeno phenomenon, performing stability analysis, proving the boundedness of a closed-loop state signal of the system, enabling the slave robot to track the motion of the master robot within a limited time, and realizing synchronous control of the teleoperation system.

In step S4, the trigger event condition is:

$$\begin{cases} \tau_i(t) = u_i(t_k^i), & \forall t \in [t_k^i, t_{k+1}^i) \\ t_{k+1}^j = \inf\{t \in R | |z_i(t)| z_i(t) \geq b_i\}, & t_1^j = 0, j = 1, 2, \ldots, n \end{cases} \quad (10)$$

in which, $z_i(t)$ represents a measurement error, $z_i(t) = [z_{i1}, z_{i2}, \ldots, z_{in}]^T$ and $z_i(t) = u_i(t) - \tau_i(t)$; $\tau_i(t)$ represents a generalized input moment of the teleoperation system, $\tau_i(t) = [\tau_{i1}, \tau_{i2}, \ldots, \tau_{in}]^T$; $b_i$ represents a positive definite matrix, $b_i(t) = [b_{i1}, b_{i2}, \ldots, b_{in}]^T \in R^n$; $u_i(t)$ represents actual controller under event trigger mechanism, $u_i(t) = [u_{i1}, u_{i2}, \ldots, u_{in}]^T$; $t_k^i$, $k \in z^+$ represents controller update time;

in a period of time $t^i \in [t_k^i, t_{k+1}^i)$, the control signal remains constant until $t^i = t_{k+1}^i$, minimum internal time of the mentioned event trigger mechanism is strictly greater than 0, which eliminates occurrence of the Zeno behavior.

Based on the designed sliding mode, the actual controller is chosen as:

$$\tau_i(t) = u_i(t) - \lambda_i(t) b_i \quad (11)$$

in which, $\lambda_i(t)$ represents a continuous time-varying parameter satisfying conditions $\lambda_i(t_k^i) = 0, \lambda_i(t_{k+1}^i) = \pm 1$ and $|\lambda_i(t)| \leq 1$, $\forall t \in [t_k^i, t_{k+1}^i)$.

The sliding mode controller of the self-adaptive fractional order nonsingular rapid terminal is designed as:

$$\begin{cases} u_m(t) = \bar{u}_m - \bar{b}_m \tanh(s_m^T M_{om}^{-1} \bar{b}_m / \varepsilon_m) \\ \bar{u}_m = M_{om}(q_m) \ddot{q}_s(t - d_s) + C_{om}(q_m, \dot{q}_m) \dot{q}_m + G_{om}(q_m) + \bar{u}_{m1} + \bar{u}_{m2} \\ \bar{u}_{m1} = -M_{om}(\Theta_m \text{sig}(s_m)^\mu + \alpha_{m1} D^{\alpha_1}[\text{sig}(e_m)^{\gamma_{m1}}] + \alpha_{m2} D^{\alpha_2 + 1}[\beta_m(e_m)]) \\ \bar{u}_{m2} = \begin{cases} -\dfrac{s_m^T M_{om}^{-1}}{\|s_m^T M_{om}^{-1}\|} \hat{\kappa}_m, & \text{if } s_m^T M_{om}^{-1} \neq 0 \\ 0, & \text{if } s_m^T M_{om}^{-1} = 0 \end{cases} \end{cases} \quad (12)$$

$$\begin{cases} u_s(t) = \bar{u}_s - \bar{b}_s \tanh(s_s^T M_{os}^{-1} \bar{b}_s / \varepsilon_s) \\ \bar{u}_s = M_{os}(q_s) \ddot{q}_m(t - d_m) + C_{os}(q_s, \dot{q}_s) \dot{q}_s + G_{os}(q_s) + \bar{u}_{s1} + \bar{u}_{s2} \\ \bar{u}_{s1} = -M_{os}(\Theta_s \text{sig}(s_s)^\mu + \alpha_{s1} D^{\alpha_1}[\text{sig}(e_s)^{\gamma_{s1}}] + \alpha_{s2} D^{\alpha_2 + 1}[\beta_s(e_s)]) \\ \bar{u}_{s2} = \begin{cases} -\dfrac{s_s^T M_{os}^{-1}}{\|s_s^T M_{os}^{-1}\|} \hat{\kappa}_s, & \text{if } s_s^T M_{os}^{-1} \neq 0 \\ 0, & \text{if } s_s^T M_{os}^{-1} = 0 \end{cases} \end{cases} \quad (13)$$

in which, $\bar{b}_m$ represents a positive definite matrix, $\bar{b}_m = [\bar{b}_{m1}, \bar{b}_{m2}, \ldots, \bar{b}_{mn}]^T$ and satisfies the constant $\bar{b}_{mj} > b_{mj}(j=1, 2, \ldots, n)$; $\bar{b}_s$ represents a positive definite matrix, $\bar{b}_s = [\bar{b}_{s1}, \bar{b}_{s2}, \ldots, \bar{b}_{sn}]^T$ and satisfies the constant $\bar{b}_{sj} > b_{sj}(j=1, 2, \ldots, n)$; $\varepsilon_m$, $\varepsilon_s$ represents a positive constant to be designed; $\Theta_i$ represents a positive definite diagonal matrix, $\Theta_i = \text{diag}[\theta_{i1}, \theta_{i2}, \ldots, \theta_{in}]$ and satisfies the constant $\theta_{ij} > 0$ (j=1, 2, \ldots, n); $\mu$ represents a positive constant to be designed and satisfies $\mu \in (0,1)$; $\hat{\kappa}$ represents an estimated value of an upper bound of $\|P_m(q_m, \dot{q}_m, \ddot{q}_m)\|$, $\hat{\kappa}_m = \hat{b}_{0m} + \hat{b}_{1m} \|\dot{q}_m\| + \hat{b}_{2m} \|\dot{q}_m\|^2$; $\hat{\kappa}_s$ represents an estimated value of an upper bound of $\|P_s(q_s, \dot{q}_s, \ddot{q}_s)\|$, $\hat{\kappa}_s = \hat{b}_{0s} + \hat{b}_{1s} \|\dot{q}_s\| + \hat{b}_{2s} \|\dot{q}_s\|^2$; variables $\hat{b}_{0i}, \hat{b}_{1i}, \hat{b}_{2i}$ representing estimated values of parameters $b_{0i}, b_{1i}, b_{2i}$ respectively;

the self-adaptation law is designed as:

$$\dot{\hat{b}}_{0i} = \Lambda_{0i} \|s_i^T M_{oi}^{-1}\|$$

$$\dot{\hat{b}}_{1i} = \Lambda_{1i} \|s_i^T M_{oi}^{-1}\| \|q_i\| \quad (14)$$

$$\dot{\hat{b}}_{2i} = \Lambda_{2i} \|s_i^T M_{oi}^{-1}\| \|q_i\|^2$$

in which, $\Lambda_{0i}, \Lambda_{1i}, \Lambda_{2i}$ represents positive constants;

a Lyapunov function is selected as:

$$V = V_1 + V_2 \quad (15)$$

$$V_1 = \sum_{i=m,s} \frac{1}{2} s_i^T s_i$$

-continued $$V_2 = \sum_{i=m,s} \frac{1}{2} \sum_{j=0}^{2} \Lambda_{ji}^{-1} \tilde{b}_{ji}^2$$

in which, V represents a Lyapunov function; $V_1$ represents a first Lyapunov function, $V_2$ represents a second Lyapunov function, $\tilde{b}_{ji}=b_{ji}-\hat{b}_{ji}$ represents a self-adaptive estimation error, j=1, 2, ..., n;

Its first derivative with time is:

$$\dot{V}_1 = \sum_{i=m,s} s_i^T \dot{s}_i \qquad (16)$$

$$= \sum_{i=m,s} s_i^T [\ddot{e}_i + \alpha_{i1} D^{\alpha_1}[sig(e_i)^{\gamma_{i1}}] + \alpha_{i2} D^{\alpha_2+1}[\beta_i(e_i)]]$$

$$\leq \sum_{i=m,s} -\overline{\Theta}_i \|s_i\|^{\mu+1} + s_i^T M_{oi}^{-1} P_i - \|s_i^T M_{oi}^{-1}\| \tilde{k}_i + s_i^T M_{oi}^{-1}$$

$$\left(-\overline{b}_i \tanh\left(\frac{s_i^T M_{oi}^{-1} \overline{b}_i}{\varepsilon_i}\right) - \lambda_i(t) b_i\right)$$

$$\dot{V}_2 = -\sum_{i=m,s} \sum_{j=0}^{2} \tilde{b}_{ji} \Lambda_{ji}^{-1} \dot{\hat{b}}_{ji}$$

$$= \sum_{i=m,s} -\tilde{b}_{0i} \|s_i M_{oi}^{-1}\| - \tilde{b}_{1i} \|s_i M_{oi}^{-1}\| \|\dot{q}_m\| -$$

$$\tilde{b}_{2i} \|s_i M_{oi}^{-1}\| \|\dot{q}_m\|^2$$

$$= \sum_{i=m,s} -\|s_i M_{oi}^{-1}\| \tilde{k}_i$$

in which, $\overline{\Theta}_i$ represents a minimum characteristic value of a matrix $\Theta_i$, $\overline{\Theta}_i=\lambda_{min}(\Theta_i)$; $\tilde{\kappa}_i$ represents an estimation error, that is, $\tilde{\kappa}_i=\kappa_i-\hat{\kappa}_i$.

Figure 3:
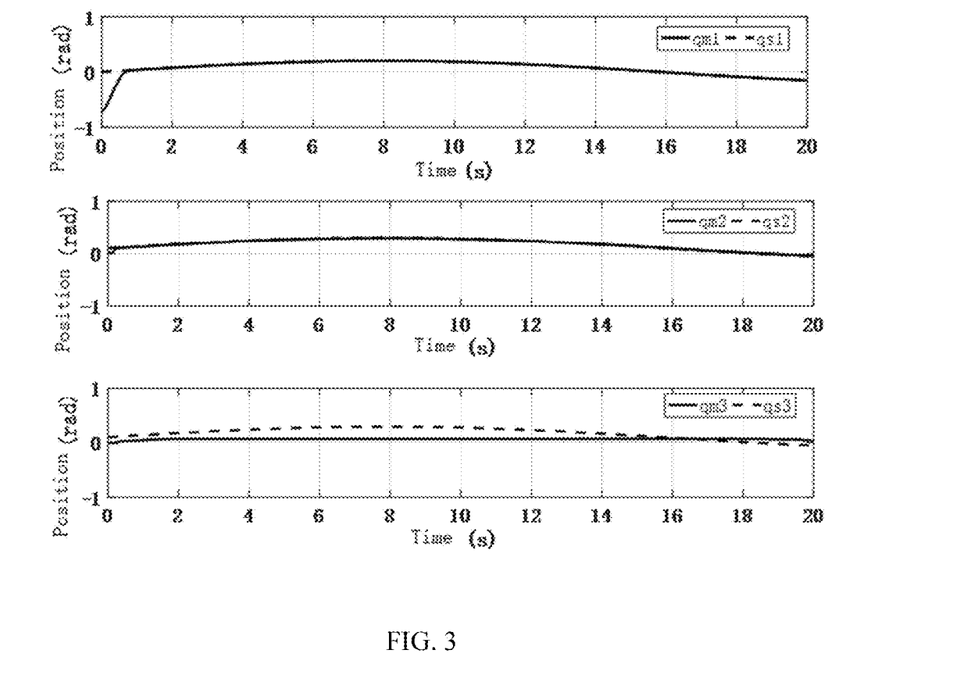
FIG. 3 is a curve graph of the trajectory of the teleoperational system according to the present invention.
Figure 4A:
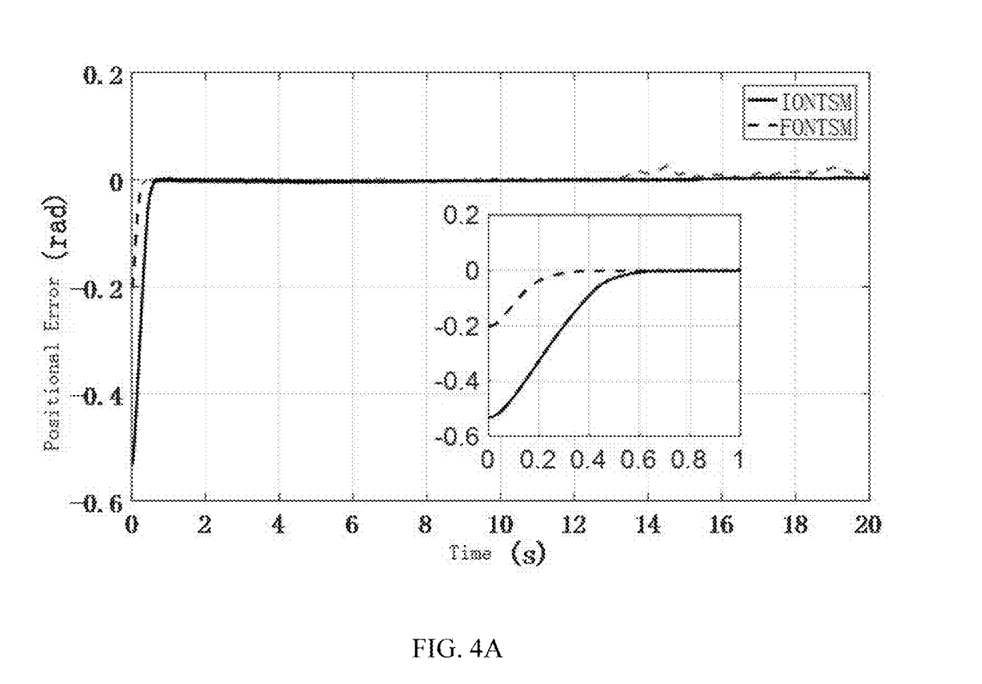
FIG. 4A is a graph comparing the tracking error of a first joint of the teleoperation system according to the present invention with that of the prior art integer order sliding mode technique.
Figure 4B:
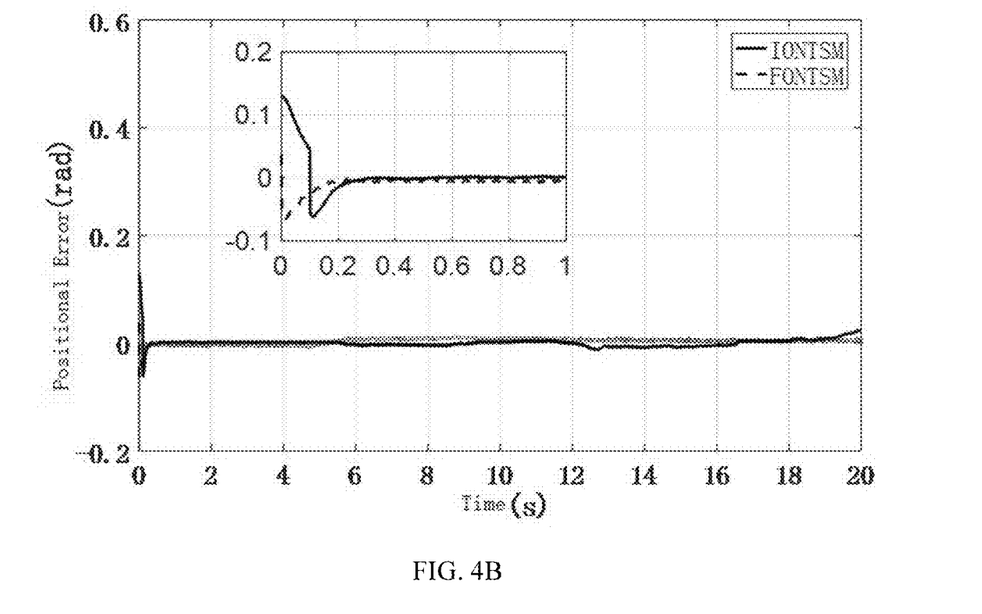
FIG. 4B is a graph comparing the tracking error of a second joint of the teleoperation system according to the present invention with that of the prior art integer order sliding mode technique.
Figure 4C:
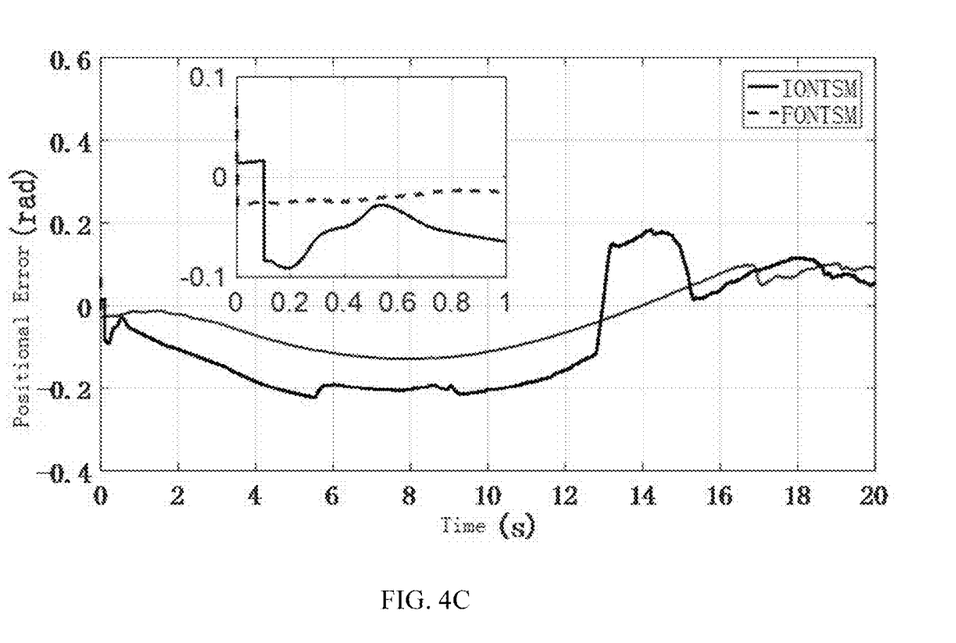
FIG. 4C is a graph comparing the tracking error of a third joint of the teleoperation system according to the present invention with that of the prior art integer order sliding mode technique.
Figure 5:
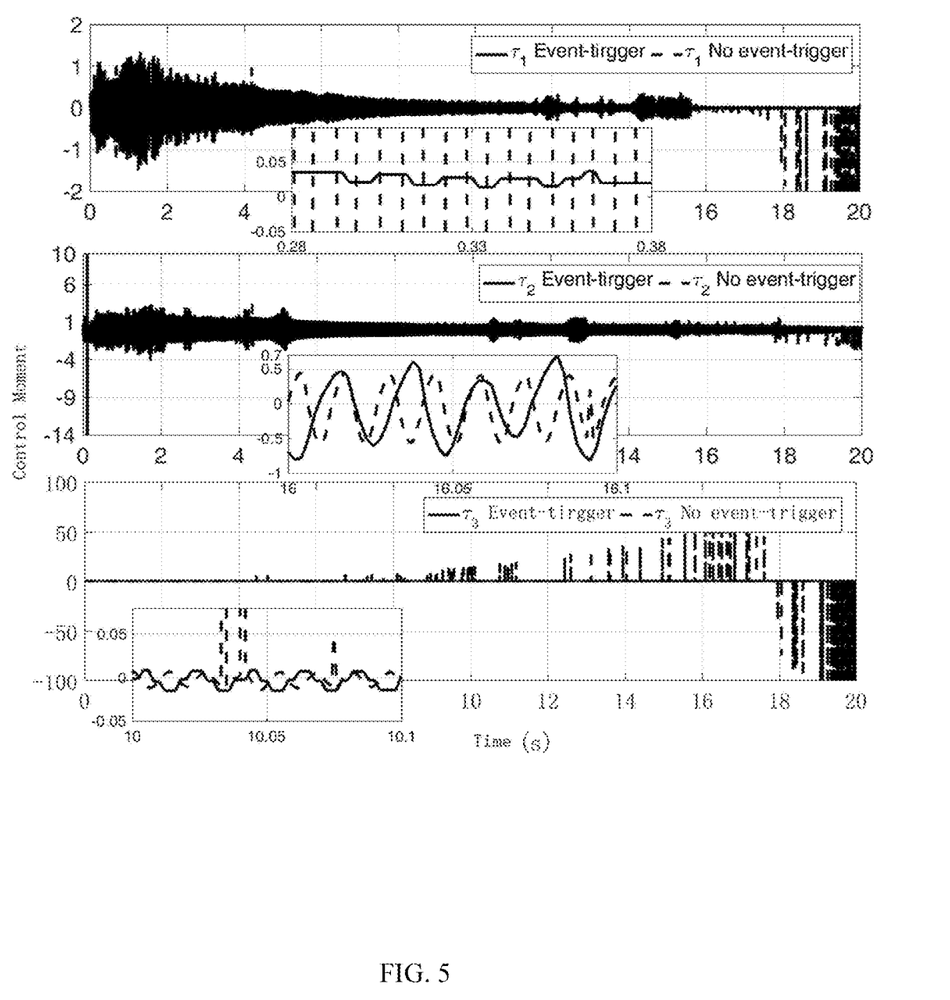
FIG. 5 is a curve graph of the controller of the teleoperational system according to the present invention.

As shown in FIG. 3, it is a curve graph of the trajectory of the self-adaptive fractional order nonsingular rapid terminal sliding mode controller based on the event trigger mechanism according to the present invention. As shown in FIGS. 4A to 4C, they are graphs comparing the tracking error of the fractional order nonsingular rapid terminal sliding mode control for the teleoperation system according to the present invention with that of the prior art integer order sliding mode technique for the teleoperation system. As shown in FIG. 5, it is a curve graph showing a comparison between the responses of the controller for the teleoperation system under the event trigger mechanism and under the time trigger mechanism in the present invention.

Effectiveness of the designed controller can be proved through experimental results, a closed loop state signal of the system is bounded, and the slave robot can track the motion of the master robot within a limited time, so that the rapid high-precision synchronous control of the teleoperation system is realized.

According to the present invention, the dynamic model for the teleoperation system under the conditions of unknown external interference and parameter uncertainty is established, and the fractional order nonsingular rapid terminal sliding mode surface is adopted, so that the singularity problem can be avoided, the degree of freedom of the controller is expanded, the convergence speed is accelerated, the control precision is improved, the buffeting problem existing in an integer order sliding mode surface is reduced, and the applicability is stronger. Compared with the prior art in which the synchronous control mode of the traditional periodic sampling of the teleoperation is adopted, the method provided by the present invention has the advantages that on the premise of ensuring the synchronous control performance of the system, the master robot and the slave robot only need to carry out intermittent communication and controller transmission and updating when the event trigger condition is met, the occupation of network bandwidth and communication resources is greatly reduced, and the utilization rate of the resources is improved.

The present invention can avoid the singularity problem, simultaneously expand the degree of freedom of the controller, accelerate the convergence speed, improve the control precision, reduce the buffeting problem existing in the integer order sliding mode surface, have stronger applicability, greatly reduce the occupation of network bandwidth and communication resources and improve the utilization rate of the resources.

Finally, it should be noted that, the above embodiments are merely illustrative of the technical solution of the present invention and not restrictive of technical solution of the present invention. Although the present invention has been described in detail with reference to the above embodiments, it should be understood by those skilled in the art that modifications and equivalents may be made thereto without departing from the spirit and scope of the present invention and it is intended to fall into the scope of the invention as defined in the appended claims.

What is claimed is:

1. A fractional order sliding mode synchronous control method for a teleoperation system based on an event trigger mechanism, characterized in that, the method comprises steps of:

S1, establishing a dynamic model for the teleoperation system by considering external disturbance and parameter uncertainty, wherein the dynamic model is:

$$M_m(q_m)\ddot{q}_m + C_m(q_m,\dot{q}_m)\dot{q}_m + G_m(q_m) + B_m(\dot{q}_m) = \tau_m + F_h$$

$$M_s(q_s)\ddot{q}_s + C_s(q_s,\dot{q}_s)\dot{q}_s + G_s(q_s) + B_s(\dot{q}_s) = \tau_s + F_e \qquad (1)$$

in which, $q_i$, $\dot{q}_i$, $\ddot{q}_i \in R^n$ respectively represent a generalized displacement, a speed and an acceleration of n joints of the robot; $M_i(q_i)$ represents a positive definite inertial matrix of the system; $C_i(q_i, \dot{q}_i)$ represents a matrix of Coriolis forces and centrifugal forces of the system; $G_i(q_i)$ represents a gravity moment of the system; $F_h$, $F_e \in R^n$ respectively represent an external force applied by an operator and an external force applied by the environment; $\tau_i \in R^n$ represents a generalized input moment; $B_i(\dot{q}_i) \in R^n$ represents a unknown external interference; i=m, s, m represents a master robot, s represents a slave robot;

$M_i(q_i)$, $C_i(q_i,\dot{q}_i)$ and $G_i(q_i)$ have a relationship of:

$$\begin{cases} M_i(q_i) = M_{oi}(q_i) + \Delta M_i(q_i) \in R^{n \times n} \\ C_i(q_i, \dot{q}_i) = C_{oi}(q_i, \dot{q}_i) + \Delta C_i(q_i, \dot{q}_i) \in R^{n \times n} \\ G_i(q_i) = G_{oi}(q_i) + \Delta G_i(q_i) \in R^n \end{cases} \qquad (2)$$

in which, $M_{oi}(q_i)$ represents a nominal value of the positive definite inertia matrix of the system; $C_{oi}(q_i,\dot{q}_i)$ represents a nominal value of the matrix of Coriolis forces and centrifugal forces of the system; $G_{oi}(q_i)$ represents a nominal value of the gravity moment of the system; $\Delta M_i(q_i)$ represents parameter change of the positive definite inertia matrix of the system; $\Delta C_i(q_i,\dot{q}_i)$ represents parameter change of the matrix of Coriolis forces and centrifugal forces of the system; $\Delta_{Gi}(q_i)$ represents parameter change of the gravity moment of the system;

at the same time, $B_i(\dot{q}_i)$ satisfies:

$$\|B_i(\dot{q}_i)\| \leq \overline{B}_i \tag{3}$$

in which, $\overline{B}_i$ represents an unknown positive number; then, $$\begin{cases} P_m(q_m, \dot{q}_m, \ddot{q}_m) = -\Delta M_m(q_m)\ddot{q}_m - \Delta C_m(q_m, \dot{q}_m)\dot{q}_m - \\ \quad \Delta G_m(q_m) - B_m(\dot{q}_m) \in R^n \\ P_s(q_s, \dot{q}_s, \ddot{q}_s) = -\Delta M_s(q_s)\ddot{q}_s - \Delta C_s(q_s, \dot{q}_s)\dot{q}_s - \Delta G_s(q_s) - \\ \quad B_s(\dot{q}_s) \in R^n \end{cases} \tag{4}$$

in which, $P_m(q_m,\dot{q}_m,\ddot{q}_m)$ represents a parameter matrix of the master robot; $P_s(q_s,\dot{q}_s,\ddot{q}_s)$ represents a parameter matrix of the slave robot;
$P_m(q_m,\dot{q}_m,\ddot{q}_m)$ and $P_s(q_s,\dot{q}_s,\ddot{q}_s)$ are bounded and satisfies:

$$\|P_m(q_m,\dot{q}_m,\ddot{q}_m)\| \leq \kappa_m$$

$$\|P_m(q_m,\dot{q}_m,\ddot{q}_m)\| \leq \kappa_s \tag{5}$$

in which, $\kappa_m$ represents an upper limit of $\|P_m(q_m,\dot{q}_m,\ddot{q}_m)\|$, $\kappa_m = b_{0m} + b_{1m}\|q_m\| + b_{2m}\|\dot{q}_m\|^2$; $\kappa_s$ represents an upper limit of $\|P_s(q_s,\dot{q}_s,\ddot{q}_s)\|$, $\kappa_s = b_{0s} + b_{1s}\|q_s\| + b_{2s}\|\dot{q}_s\|^2$; $b_{0i}$, $b_{1i}$, $b_{2i}$(i=m, s) is a positive constant;
accordingly, equation (1) for the system is re-represented as:

$$\begin{cases} M_{om}(q_m)\ddot{q}_m + C_{om}(q_m, \dot{q}_m)\dot{q}_m + G_{om}(q_m) = \tau_m + \\ \quad P_m(q_m, \dot{q}_m, \ddot{q}_m) + F_h \\ M_{os}(q_s)\ddot{q}_s + C_{os}(q_s, \dot{q}_s)\dot{q}_s + G_{os}(q_s) = \tau_s + \\ \quad P_s(q_s, \dot{q}_s, \ddot{q}_s) - F_e \end{cases} \tag{6}$$

S2, selecting the master robot and the slave robot, interactively constructing the teleoperation system through a communication network, measuring respectively mass and length information of a master robot connecting rod and a slave robot connecting rod and real-time robot position information of the master robot connecting rod and the slave robot connecting rod, and determining system parameters of the dynamic model;

S3, designing a sliding mode surface equation of a fractional order nonsingular rapid terminal by using position tracking errors of the master robot and the slave robot and Riemann-Liouville fractional order calculus;

S4, setting a trigger event condition of information interaction between the master robot and the slave robot, designing a self-adaptive fractional order nonsingular rapid terminal sliding mode controller which can compensate measurement errors and eliminate the influence of system uncertainty based on the sliding mode, enabling the controller to avoid the Zeno phenomenon, performing stability analysis, proving the boundedness of a closed-loop state signal of the system, enabling the slave robot to track the motion of the master robot within a limited time, and realizing synchronous control of the teleoperation system;

in step S4, the trigger event condition is:

$$\begin{cases} \tau_i(t) = u_i(t_k^i), \forall t \in [t_k^i, t_{k+1}^i) \\ t_{k+1}^j = \inf\{t \in R | |z_i(t)| z_i(t) \geq b_i\}, t_1^i = 0, j = 1, 2, \ldots, n \end{cases} \tag{10}$$

in which, $z_i(t)$ represents a measurement error, $z_i(t) = [z_{i1}, z_{i2}, \ldots, z_{in}]^T$ and $z_i(t) = u_i(t) - \tau_i(t)$; $\tau_i(t)$ represents a generalized input moment of the teleoperation system, $\tau_i(t) = [\tau_{i1}, \tau_{i2}, \ldots, \tau_{in}]^T$; $b_i$ represents a positive definite matrix, $b_i(t) = [b_{i1}, b_{i2}, \ldots, b_{in}]^T \in R^n$; $u_i(t)$ represents actual controller under event trigger mechanism, $u_i(t) = [u_{i1}, u_{i2}, \ldots, u_{in}]^T$; $t_k^i$, $k \in z^+$ represents controller update time;

in a period of time $t^i \in [t_k^i, t_{k+1}^i)$, the control signal remains constant until $t^i = t_{k+1}^i$, minimum internal time of the mentioned event trigger mechanism is strictly greater than 0, which eliminates occurrence of the Zeno behavior;

based on the designed sliding mode, the actual controller is chosen as:

$$\tau_i(t) = u_i(t) - \lambda_i(t)b_i \tag{11}$$

in which, $\lambda_i(t)$ represents a continuous time-varying parameter satisfying conditions $\lambda_i(t_k^i) = 0, \lambda_i(t_{k+1}^i) = \pm 1$ and $|\lambda_i(t)| \leq 1$, $\forall t \in [t_k^i, t_{k+1}^i)$;

the sliding mode controller of the self-adaptive fractional order nonsingular rapid terminal is designed as:

$$\begin{cases} u_m(t) = \overline{u}_m - \overline{b}_m \tanh(s_m^T M_{om}^{-1} \overline{b}_m / \varepsilon_m) \\ \overline{u}_m = M_{om}(q_m)\ddot{q}_s(t - d_s) + C_{om}(q_m, \dot{q}_m)\dot{q}_m + G_{om}(q_m) + \\ \quad \overline{u}_{m1} + \overline{u}_{m2} \\ \overline{u}_{m1} = -M_{om}(\Theta_m \text{sig}(s_m)^\mu + \alpha_{m1} D^{\alpha_1}[\text{sig}(e_m)^{\gamma_{m1}}] + \\ \quad \alpha_{m2} D^{\alpha_2 + 1}[\beta_m(e_m)]) \\ \overline{u}_{m2} = \begin{cases} -\frac{s_m^T M_{om}^{-1}}{\|s_m^T M_{om}^{-1}\|} \hat{\kappa}_m, & \text{if } s_m^T M_{om}^{-1} \neq 0 \\ 0, & \text{if } s_m^T M_{om}^{-1} = 0 \end{cases} \end{cases} \tag{12}$$

$$\begin{cases} u_s(t) = \overline{u}_s - \overline{b}_s \tanh(s_s^T M_{os}^{-1} \overline{b}_s / \varepsilon_s) \\ \overline{u}_s = M_{os}(q_s)\ddot{q}_m(t - d_m) + C_{os}(q_s, \dot{q}_s)\dot{q}_s + G_{os}(q_s) + \\ \quad \overline{u}_{s1} + \overline{u}_{s2} \\ \overline{u}_{s1} = -M_{os}(\Theta_s \text{sig}(s_s)^\mu + \alpha_{s1} D^{\alpha_1}[\text{sig}(e_s)^{\gamma_{s1}}] + \\ \quad \alpha_{s2} D^{\alpha_2 + 1}[\beta_s(e_s)]) \\ \overline{u}_{s2} = \begin{cases} -\frac{s_s^T M_{os}^{-1}}{\|s_s^T M_{os}^{-1}\|} \hat{\kappa}_s, & \text{if } s_s^T M_{os}^{-1} \neq 0 \\ 0, & \text{if } s_s^T M_{os}^{-1} = 0 \end{cases} \end{cases} \tag{13}$$

in which, $\overline{b}_m$ represents a positive definite matrix, $\overline{b}_m = [\overline{b}_{m1}, \overline{b}_{m2}, \ldots, \overline{b}_{mn}]^T$ and satisfies the constant $\overline{b}_{mj} > b_{mj}$(j=1, 2, \ldots, n); $\overline{b}_s$ represents a positive definite matrix, $\overline{b}_s = [\overline{b}_{s1}, \overline{b}_{s2}, \ldots, \overline{b}_{sn}]^T$ and satisfies the constant $\overline{b}_{sj} > b_{sj}$(j=1, 2, \ldots, n); $\varepsilon_m$, $\varepsilon_s$ represents a positive constant to be designed; $\Theta_i$ represents a positive definite diagonal matrix, $\Theta_i = \text{diag}[\theta_{i1}, \theta_{i2}, \ldots, \theta_{in}]$ and satisfies the constant $\theta_{ij} > 0$(j=1, 2, \ldots, n); $\mu$ represents a positive constant to be designed and satisfies $\mu \in (0,1)$; $\hat{\kappa}_m$ represents an estimated value of an upper bound of $\|P_m(q_m, \dot{q}_m, \ddot{q}_m)\|$, $\hat{\kappa}_m = \hat{b}_{0m} + \hat{b}_{1m}\|\| + \hat{b}_{2m}\|\dot{q}_m\|^2$; $\hat{\kappa}_s$ represents an estimated value of an upper bound of $\|P_s(q_s, \dot{q}_s, \ddot{q}_s)\|$, $\hat{\kappa}_s = \hat{b}_{0s} + \hat{b}_{1s}\|\| + \hat{b}_{2s}\|\dot{q}_s\|^2$; variables $\hat{b}_{0i}$, $\hat{b}_{1i}$, $\hat{b}_{2i}$ representing estimated values of parameters $b_{0i}$, $b_{1i}$, $b_{2i}$, respectively;

the self-adaptation law is designed as:

$$\dot{\hat{b}}_{0i} = \Lambda_{0i}\|s_i^T M_{oi}^{-1}\|$$

$$\dot{\hat{b}}_{1i} = \Lambda_{1i}\|s_i^T M_{oi}^{-1}\|\|q_i\| \tag{14}$$

$$\dot{\hat{b}}_{2i} = \Lambda_{2i}\|s_i^T M_{oi}^{-1}\|\|\dot{q}_i\|^2$$

in which, $\Lambda_{0i}$, $\Lambda_{1i}$, $\Lambda_{2i}$ represents positive constants;
a Lyapunov function is selected as:

$$V = V_1 + V_2 \tag{15}$$

-continued $$V_1 = \sum_{i=m,s} \frac{1}{2} s_i^T s_i$$

$$V_2 = \sum_{i=m,s} \frac{1}{2} \sum_{j=0}^{2} \Lambda_{ji}^{-1} \tilde{b}_{ji}^2$$

in which, V represents a Lyapunov function; $V_1$ represents a first Lyapunov function, $V_2$ represents a second Lyapunov function, $\tilde{b}_{ji} = b_{ji} - \hat{b}_{ji}$ represents a self-adaptive estimation error, j=1, 2, . . . , n;

limited time stable operation of the nonlinear uncertain teleoperation system is ensured through stability analysis.

2. The method according to claim 1, characterized in that, system parameters of the dynamical model in step S2 comprise nominally determined parts of the inertia matrix, the matrix of Coriolis forces and centrifugal forces, and the gravity matrix of the master robot and the slave robot, and are all calculated from the length, mass, and joint position information of a mechanical arm.

3. The method according to claim 1, characterized in that, the position tracking errors of the master robot and the slave robot in step S3 are:

$$e_m = q_m - q_s(t - d_s)$$

$$e_s = q_s - q_m(t - d_m) \quad (7)$$

in which, $e_m$ represents position tracking error of the master robot; $e_s$ represents position tracking error of the slave robot; $d_m$ represents fixed-length time delay of forward information transmission from the master robot to the slave robot; $d_s$ represents fixed-length time delay of backward information transmission from the slave robot to the master robot, and $d_m \neq d_s$; t represents an operating time;

the fractional order nonsingular rapid terminal sliding mode surface equation is:

$$s_m(t) = \dot{e}_m + \alpha_{m1} D^{\alpha_1 - 1}[\text{sig}(e_m)^{\gamma_{m1}}] + \alpha_{m2} D^{\alpha_2}[\beta_m(e_m)]$$

$$s_s(t) = \dot{e}_s + \alpha_{s1} D^{\alpha_1 - 1}[\text{sig}(e_s)^{\gamma_{s1}}] + \alpha_{s2} D^{\alpha_2}[\beta_s(e_s)] \quad (8)$$

in which, $s_i$ represents designed fractional order nonsingular fast terminal sliding mode surface, $s_i = [s_{i1}, s_{i2}, \ldots s_{in}]^T \in R^n$; $\gamma_{i1}$ is a positive constant, $\gamma_{m1}, \gamma_{s1} > 1$; $\alpha_1, \alpha_2$ represent fractional orders and $\alpha_1 \in (0,1], \alpha_2 \in [0, 1)$; $D^{\alpha_1 - 1}\text{sig}(e_i)^{\gamma_{i1}}]$ represents $\alpha_1 - 1$ ordered Riemann-Liouville fractional order derivative of $\text{sig}(e_i)^{\gamma_{i1}}$; $D^{\alpha_2}[\beta_i(e_i)]$ represents $\alpha_2$ ordered Riemann-Liouville fractional order derivative of $\beta_i(e_1)$; $\alpha_{i1}$ and $\alpha_{i2}$ both represent parameters of the sliding mode surface equation and are positive definite diagonal matrix, $\alpha_{i1} = \text{diag}(\alpha_{i11}, \alpha_{i12}, \ldots, \alpha_{i1n})$, $\alpha_{i2} = \text{diag}(\alpha_{i21}, \alpha_{i22}, \ldots, \alpha_{i2n})$; functions $\beta_m(e_m), \beta_s(e_s)$ are described as:

$$\beta_m(e_m) = \begin{cases} \text{sig}(e_m)^{\gamma_{m2}}, & \text{if } \bar{s}_m = 0 \text{ or } \bar{s}_m \neq 0, |e_m| > \delta_m \\ k_{m1}e_m + k_{m2}\text{sign}(e_m)e_m^2, & \text{if } \bar{s}_m \neq 0, |e_m| \leq \delta_m \end{cases} \quad (9)$$

$$\beta_s(e_s) = \begin{cases} \text{sig}(e_s)^{\gamma_{s2}}, & \text{if } \bar{s}_s = 0 \text{ or } \bar{s}_s \neq 0, |e_s| > \delta_s \\ k_{s1}e_s + k_{s2}\text{sign}(e_s)e_s^2, & \text{if } \bar{s}_s \neq 0, |e_s| \leq \delta_s \end{cases}$$

in which, $\bar{s}_m$ represents a terminal sliding mode surface which shows that the main robot has a singularity problem, $\bar{s}_m = \dot{e}_m + \alpha_{m1} D^{\alpha_1 - 1}[\text{sig}(e_m)^{\gamma_{m1}}] + \alpha_{m2} D^{\alpha_2}[\text{sig}(e_m)^{\gamma_{m2}}]$; $\bar{s}_s$ represents a terminal sliding mode surface which shows that the slave robot has a singularity problem, $\bar{s}_s = \dot{e}_s + \alpha_{s1} D^{\alpha_1 - 1}[\text{sig}(e_s)^{\gamma_{s1}}] + \alpha_{s2} D^{\alpha_2}[\text{sig}(e_s)^{\gamma_{s2}}]$; $\gamma_{i2}$ is a positive constant, $0 < \gamma_{m2}, \gamma_{s2} < 1$; $k_{m1}$ is a positive constant, $k_{m1} = (2 - \gamma_{m2})\delta_m^{\gamma_{m2} - 1}$; $k_{m2}$ is a positive constant, $k_{m2} = (\gamma_{m2} - 1)\delta_m^{\gamma_{m2} - 2}$; $k_{s1}$ is a positive constant, $k_{s1} = (2 - \gamma_{s2})\delta_s^{\gamma_{m2} - 1}$; $k_{s2}$ is a positive constant, $k_{s2} = (\gamma_{s2} - 1)\delta_s^{\gamma_{s2} - 2}$; $\delta_m, \delta_s$ represents designed small constant.

* * * * *